United States Patent [19]

Barrows et al.

[11] 3,841,482
[45] Oct. 15, 1974

[54] SELF-CLEANING SCREEN ASSEMBLY

[75] Inventors: John B. Barrows, Troy, Mich.;
Leslie T. Hansen, Lakewood, Calif.

[73] Assignee: Sweco, Inc., Los Angeles, Calif.

[22] Filed: Nov. 6, 1972

[21] Appl. No.: 304,084

[52] U.S. Cl. .............................. 209/323, 209/382
[51] Int. Cl. .............................................. B07b 1/28
[58] Field of Search .......... 209/323, 381, 382, 385, 209/387, 325

[56] References Cited
UNITED STATES PATENTS

| | | | |
|---|---|---|---|
| 2,001,631 | 5/1935 | Rice | 209/382 |
| 3,366,239 | 1/1968 | Swallow | 209/382 X |
| 3,425,554 | 2/1969 | Swallow | 209/382 X |
| 3,616,906 | 11/1971 | Miller et al. | 209/325 X |

*Primary Examiner*—Francis S. Husar
*Assistant Examiner*—W. R. Briggs
*Attorney, Agent, or Firm*—Lyon & Lyon

[57] ABSTRACT

A self-cleaning screen assembly used for separating material in a vibratory separator is disclosed. The assembly includes a separator screen, a plate located beneath the screen, sliders located between the screen and the plate which act to clean the screen, and one or two retainer rings which act to constrain the sliders from circulating in areas below the separator screen where high wear would otherwise be experienced. The rings are constructed to prevent their wearing on the screen as well.

15 Claims, 3 Drawing Figures

PATENTED OCT 15 1974  3,841,482

SELF-CLEANING SCREEN ASSEMBLY

This invention relates to self-cleaning screen assemblies used in vibratory separators. More specifically, this invention is directed to means for improving the wear properties of the separator screens in such assemblies.

Self-cleaning screens employed with vibratory separators have been developed which employ a screen for separating influent material, a plate (or screen) located beneath the separator screen which has an extensive pattern of holes located across the plate to allow the unscreened material to pass therethrough, and sliders located between the separator screen and the plate which act to clean the spearator screen. The sliders accomplish the cleaning operation by moving about the plate when subjected to the vibratory action of the separator. One such self-cleaning screen assembly is disclosed in the D.M. Swallow U.S. Letters Patent No. 3,366,239.

These self-cleaning separator screen assemblies have very effectively performed the screening function while at the same time providing a self-cleaning system. However, it has been found that the separator screen associated with these assemblies sometimes wear very rapidly in two sepcific areas. The screens are subjected to high wear about their periphery in an area adjacent the screen tension ring. Further, the separator screens exhibit heavy wear in an area about the influent distribution point. Consequently, periodic replacement of the screening material is required which naturally involves cost and possible undesired down-time of the equipment.

An object of the present invention is to provide a self-cleaning screen assembly which eliminates the rapid wearing of the separator screen about its periphery. It has been found that this excessive wear is brought about by the action of the sliders abrading the screen at a point adjacent the screen tension ring of the self-cleaning screen assembly. A retainer means has been devised which prevents the sliders from approaching the high wear areas of the screen.

A second object of the present invention is to provide a self-cleaning screen assembly which eliminates the rapid wearing of the screen in the area first subjected to the influent material. It has been found that excessive wear in the area where the influent is first distributed is caused by the weight of that influent material forcing the screen downward against the sliders. This causes a continuous abrasive action of the sliders on the screen. A retainer means is provided which prevents the sliders from approaching this first point of influent distribution to prevent such continuous abrasion. Further, where an inner screen tension ring is provided, the retainer means acts to prevent abrasive action like that experienced at the periphery of the screen.

Another object of the present invention is to provide a retainer means for restricting the circulation of the sliders in a self-cleaning screen assembly, wherein the retainer means does not abrade the separator screen. A soft material or materials are used in conjunction with means for spacing the retainers to accomplish this result. Consequently, wear from all of the inner components of the self-cleaning screen assembly is reduced at all points to a wear rate normally associated with the low wear areas of the self-cleaning screen assembly.

Thus, a self-cleaning screen assembly is provided for use with a vibratory separator which does not subject the separator screen to high abrasion from the inner components of the assembly. Further objects and advantages will become apparent from the description herein.

Figure 1:
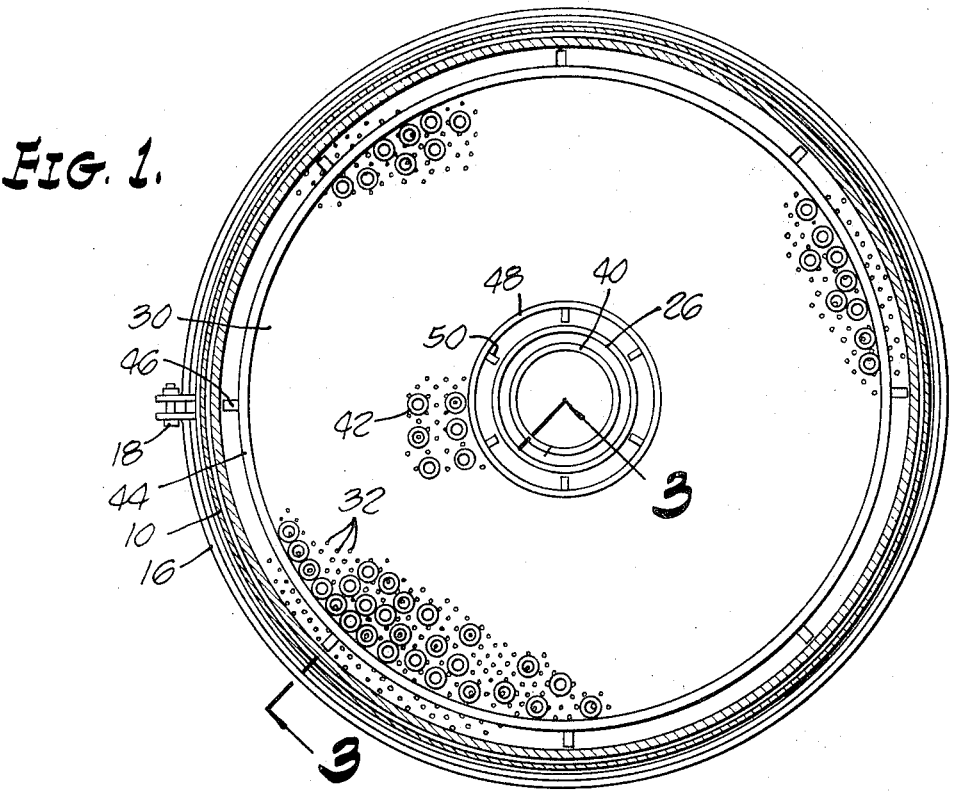
FIG. 1 is a plan view of a self-cleaning screen assembly with the upper screen removed for clarity.
Figure 2:
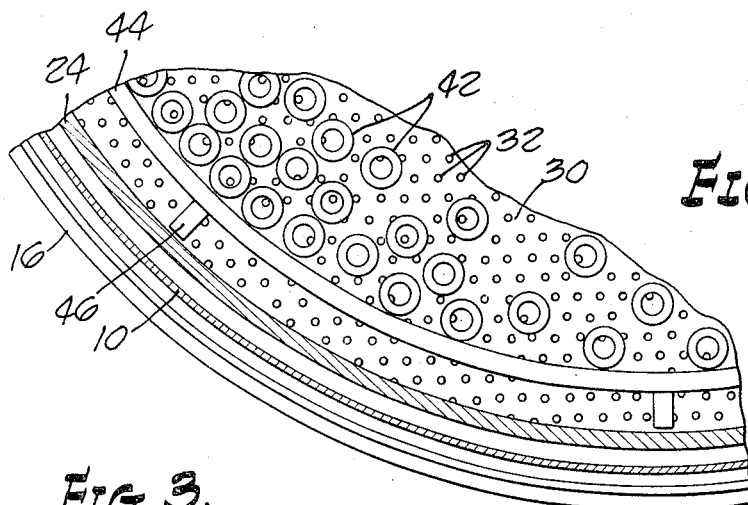
FIG. 2 is an enlarged fragmentary view of the self-cleaning screen assembly as shown in FIG. 1.
Figure 3:
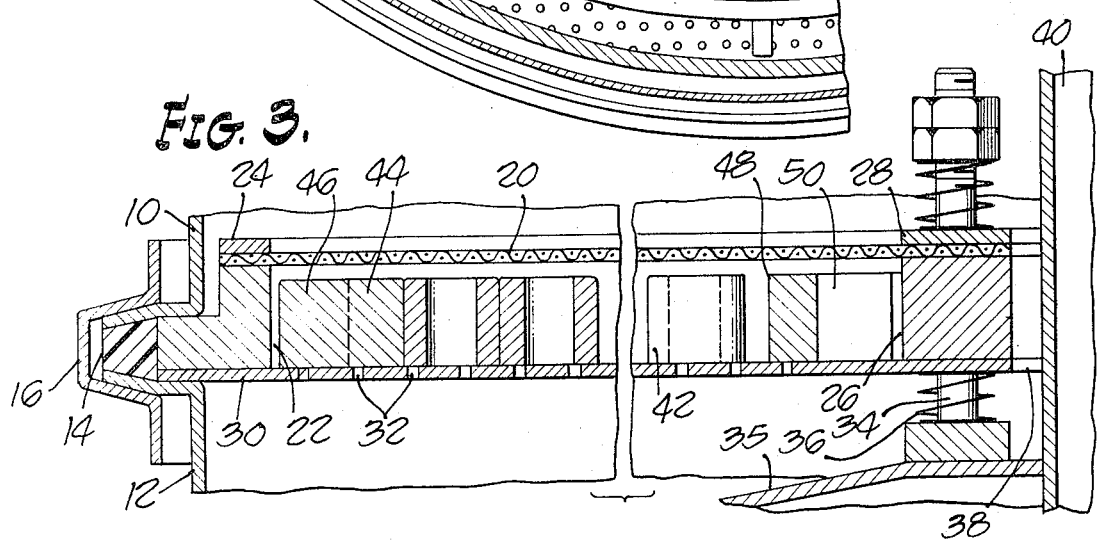
FIG. 3 is a cross sectional view along Line 3—3 of FIG. 1 illustrating a cross section of the retainer means.

Turning now to the drawings, a self-cleaning screen assembly is shown which forms the separating element of a vibratory separator. The self-cleaning screen structure herein described is particularly adapted for use in the type of vibratory circular separator shown in the series of Miller et al. U.S. Pat. Nos. 2,696,302, 2,753,999, 2,777,578, and 2,714,961, the McCausland U.S. Pat. No. 3,035,700, and the Wright, Jr., et al. U.S. Pat. No. 3,029,946, as well as the type of vibratory circular separator shown in the Miller et al. U.S. Pat. No. 3,616,906. The means for assembling these self-cleaning screen units is illustrated in FIG. 3. The circular side walls 10 and 12, are positioned concentrically with the self-cleaning separating unit. A wedge-shaped ring 14 is positioned between the walls 10 and 12. A circular clamp 16 is then positioned over the extensions of walls 10 and 12 as shown and secured in that position by bolt 18.

The self-cleaning screen assembly is shown with a separator screen 20 which performs the separating function of the device. The separator screen 20 is sized to provide the screening desired. A circular tension ring 22 is provided about the periphery of the separator screen 20. The separator screen 20 is placed in tension and held to the ring 22 by ring 24 in a conventional manner. In a similar fashion where a central distribution system is employed, inner tension ring 26 is positioned at the center of separator screen 20, and the screen 20 is held in tension by the ring 26 and a ring 28 in a conventional manner. When metal rings 22, 24, 26 and 28 are used, they may be spot welded together to hold the edges of the screen 20 in a sandwich fashion. Plastic tension rings likewise may be used wherein the screen edges are molded into the rings. Where a central distributor is not positioned through the separator screen assembly, a centrally located tie down rod is employed to which the separator screen is resiliently tied.

A support member 30 is positioned beneath the separator screen 20. Rings 22 and 26 further act as spacers to properly separate the screen 20 from the support member 30. THis support member 30 may be a second screen, but more commonly is a plate as illustrated in the figures. The plate 30 has a plurality of holes 32 therethrough. These holes are of sufficient diameter to allow passage of all particles which are able to pass through the separator screen 20. The plate 30 does not provide any screening function, but is designed to support sliders 42 and to present a minimum obstruction to the material flow. The cumulative open area of the holes 32 preferably is equal to or greater than the cumulative open area of the sliders 42 and between these sliders so as not to impede material flow. When in position, the plate 30 is supported about its periphery on the lower wall section 12. About the center, plate 30 is positioned over studs 34 which are in turn rigidly fixed to the discharge plate 35 of the vibratory separator. Several studs 34 are located about the center of the separator. The plate 30 is supported on studs 34 by springs 36 which provide a more flexible coupling of the plate 30 with the central portion of the separator. The plate 30 is of the same diameter as the tension ring 22 for convenience of assembly in the separator. A concentric hole 38 is provided in plate 30 in order that plate 30 may fit over the influent distribution mechanism 40 where a central distributor is used.

Sliders 42 are positioned on the plate 30. These sliders 42 act to clean the separator screen 20 by virtue of the motions set up in the sliders 42 by the vibratory action of the separator. As discussed in the aforementioned Swallow Patent, these sliders 42 may take any one of a great numer of forms. Preferably, the diagonal dimension of each slider is greater than the distance between the separator screen 20 and the plate 30 in order that the proper orientation of each slider 42 may be maintained under vibratory conditions. Further, it is preferred that the sliders 42 be of sufficient diameter in relation to the diameter of holes 32 to prevent catching of the sliders 42 in any one of holes 32. Also, the sliders 32 are caused to circulate on the plate 30 under screen 20 by virtue of the vibratory motion of the separator screen assembly. This vibratory motion is imparted in a known manner by a rotary power source (e.g., an electric motor) having eccentrically mounted weights on the shaft thereof. Consequently, it is beneficial to allow the sliders 42 sufficient room to move about and not to pack them solidly on the plate 30; however, usually the sliders substantially fill the area between the outer and inner rings 22 and 26.

To prevent wear of the separator screen 20 in the area immediately adjacent the separator screen tension ring 22, means are provided for constraining the sliders 42 from impacting the separator screen 20 in this area. One form of such constraining means which conveniently can be employed to prevent such impact of these sliders 42 is provided by an outer retainer ring 44. The retainer ring 44 fits within the outer separator screen tension ring 22 between the separator screen 20 and the plate 30. All of the sliders 42 are placed within this retainer ring 44 and consequently are separated from the area of the separator screen tension ring 22. The retainer ring 44 must be of sufficient height to prevent the sliders 42 from passing over the ring 44 into the area between the retainer ring 44 and the tension ring 22. Further, it is helpful to have the retainer ring 44 high enough to preclude any propensity of the sliders 42 to tip over the retainer ring 44. Most conveniently, the retainer ring 44 can be the same height as the sliders 42.

To insure that the retainer ring 44 does not effect a similar wearing of the separator screen 20, the retainer ring 44 is constructed of comparatively soft material. A material which has been found to be excellent for this use is polypropylene. To further insure against wear of both the separator screen 20 and the retainer ring 44, spacers 46 are provided about the retainer ring 44. The spacers 46 are conveniently made of similar soft material and are secured to the retainer ring 44 or molded therewith. The spacers 46 are conveniently made of retainer ring 44 toward the separator screen tension ring 22. It has been found that eight such spacers 46 spaced symmetrically about the retainer ring 44 are sufficient to insure proper spacing of the retainer ring 44 from the separator screen tension ring 22. The spacers 46 act to center the retainer ring 44 on the plate 30. The retainer ring 44 is spaced from the separator screen tension ring 22 by relatively thin spacers 46 and, thus, there is not significant screen wear in this outer area like that which could be caused by a thick retainer ring (having a radial thickness equal to the ring 44 and spacers 46) or by unconstrained sliders 42 in this area. It has been found that the retainer ring 44 when centered on the plate 30 should leave a space of approximately one inch or more between the retainer ring 44 and the separator screen tension ring 22 for best results. Consequently, the specers 46 should also be approximately one inch in length. However, it is preferred that the retainer ring 44 and spacers 46 should not fit snugly against the separator screen tension ring 22 in order that the retainer ring 44 may itself move about on the plate 30 when the separator is in motion.

A second configuration which may be employed to provide a retainer means for constraining the sliders 42 from approaching the separator screen tension ring 22 involves a retainer ring similar to the retainer ring 44 illustrated in the drawings. In this second configuration, spacers 46 are eliminated and instead the retainer ring 44 is secured to the plate 30. To accomplish this, it is beneficial to have the plate 30 of a plastic material compatible with the soft plastic material used for the retainer ring 44. In this regard, the plate 30 may be formed of fiberglass and the ring 44 may be molded as an integral part of the plate.

A second high wear area on the separator screen 20 has been observed at the inner edge of the separator screen 20. The high wear experienced in this area is also caused by the action of the sliders 42 abrading the separator screen 20. Again, this high wear problem can be solved by an inner retainer ring 48 similar to retainer ring 44 which is employed at the central portion of the self-cleaning screen assembly. The inner retainer ring 48 is preferably constructed of a soft material such as polypropylene. However, in this substance the spacers 50 are directly radially inward toward the inner tension ring 26. Eight such spacers are employed symmetrically about the inner surface of the retainer ring 48. Further, it is advantageous to space the inner retainer ring 48 from the inner separator screen tension ring approximately one inch or more to prevent a high wearing of the separator screen 20 at the inner retainer ring 48. Where an inner tension ring is not employed but rather a tie rod is centrally located on the screen 20, the spacers 50 extend inward to the tie rod. Again, sufficient tolerance is provided to allow some action of the inner retainer ring 48.

Using this retainer means to cause the sliders 42 to circulate on plate 30 a prescribed distance from both the outer tension ring 22 and the inner tension ring 26, the sliders 42 will bring about a cleaning action of the separator screen 20 as they are driven about by the motion of the vibratory separator. Because of the retainer means, the separator screen 20 will experience relatively uniform wear across its entire area. In this way, the entire vibratory separator becomes far more useful for it does not require frequent disassembly for replacement of the separator screen 20.

Having fully described the invention, it is to be understood that the invention is not to be limited to the details herein set forth, but that it is of the full scope of the appended claims.

What is claimed is:

1. A self-cleaning screen assembly for use in a vibratory separator comprising a separator screen, said screen having influent and peripheral areas, a support member located beneath said separator screen and extending parallel thereto, tension means for tensioning said separator screen about the peripheral area thereof, a plurality of sliders positioned between said separator screen and said support member, said sliders being free to move on said support members, and retainer means positioned between said screen and said support member for constraining said sliders from engaging at least one of said areas of said separator screen, said retainer means being slidably positioned on said support member.

2. A self-cleaning screen assembly as in claim 1 wherein said retainer means comprises a retainer ring disposed beneath said peripheral area of said separator screen, and includes a plurality of spacers spacing said retainer ring from said tension means.

3. A self-cleaning screen assembly as in claim 1 wherein said retainer means comprises a retainer ring disposed beneath said influent area of said separator screen.

4. A self-cleaning screen assembly as in claim 1, wherein said retainer means comprises a retainer ring disposed beneath said influent area of said separator screen, said influent area being centrally located on said separator screen, and including a plurality of spacers spacing said retainer ring from said central influent area.

5. A self-cleaning screen assembly for use in a vibratory separator comprising a separator screen, said screen having influent and peripheral areas, a support member located beneath said separator screen and extending parallel thereto, tension means for tensioning said separator screen about the peripheral area thereof, a plurality of sliders positioned between said separator screen and said support member, said sliders being free to move on said support member, and retainer means positioned between said screen and said support member for constraining said sliders from engaging at least one of said areas of said separator screen, wherein said first retainer means comprises a first retainer ring disposed beneath said peripheral area of said separator screen, a plurality of spacers positioned on said first retainer ring, said spacers spacing said first retainer, ring from said tension means, a second retainer ring disposed beneath said influent area of said separator screen, said influent area being centrally located on said separator screen, and a plurality of spacers positioned on said second retainer ring, said spacers spacing said second retainer ring from said central influent area.

6. A self-cleaning screen assembly as in claim 1, wherein extend radially from the no said retainer means is composed of relatively soft material for minimizing abrasion of said separator screen.

7. A self-cleaning screen assembly as in claim 1, wherein said retainer means is composed of polypropylene.

8. A self-cleaning screen assembly as in claim 1, wherein said constraining means is of sufficient height to prevent said sliders from passing between said retainer means and said separator screen.

9. A self-cleaning screen assembly for use in a vibratory separator comprising a separator screen, said screen having influent and peripheral areas, a support member located beneath said separator screen and extending parallel thereto, tension means for tensioning said separator screen about the peripheral area thereof, a plurality of sliders positioned between said separator screen and said support member, said sliders being free to move on said support member, and retainer means positioned between said screen and said support member for constraining said sliders from engaging at least one of said areas of said separator screen, said retainer means comprises a cylindrical ring having first and second concentrically disposed sides, and spacers radially disposed on the first concentrically disposed side of said cylindrical ring, said spacers covering a relatively small area of said first side.

10. A self-cleaning screen assembly as in claim 9, wherein said cylindrical ring further comprises top and bottom surfaces, said top surface being at a normal distance from said bottom surface, with said normal distance being greater than the space between said sliders and said separator screen.

11. A self-cleaning screen assembly as in claim 9, wherein said cylindrical ring is disposed beneath said peripheral area of said separator screen, and said influent area comprises a central area of said separator screen and said retainer means further includes a second cylindrical ring disposed beneath said central area of said screen, said second cylindrical ring having first and second cencentrically disposed sides, and spacers radially disposed on the second concentrically disposed side of said second cylindrical ring.

12. In a self-cleaning screen assembly for use in a vibratory separator, the self cleaning screen assembly having a separator screen, a support member located beneath the separator screen and extending parallel thereto, and sliders positioned between the separator screen and the support member, a slider retainer comprising a cylindrical ring having first and second concentrically disposed sides, and spacers radially disposed on the first concentrically disposed side of said cylindrical ring, said spacers covering a relatively small area of said first side, said slider retainer being slidably positioned on the support member.

13. A slider retainer as in claim 12 wherein said cylindrical ring further comprises a top surface and a bottom surface, said top surface being at a normal distance from said bottom surface which is greater than the space between the sliders and the separator screen.

14. The device of claim 12, wherein said first and said second cylindrical rings are composed of relatively soft material for minimizing abrasion of the separator screen.

15. The device of claim 14, wherein said relatively soft material is polypropylene.

* * * * *

UNITED STATES PATENT OFFICE
CERTIFICATE OF CORRECTION

Patent No. 3,841,482          Dated October 15, 1974

Inventor(s)  John B. Barrows & Leslie T. Hansen

It is certified that error appears in the above-identified patent and that said Letters Patent are hereby corrected as shown below:

In column 5, line 67, delete "extend radially from the no".

Signed and sealed this 17th day of December 1974.

(SEAL)
Attest:

McCOY M. GIBSON JR.
  Attesting Officer

C. MARSHALL DANN
  Commissioner of Patents